United States Patent [19]

von Röpenack et al.

[11] 4,107,265

[45] Aug. 15, 1978

[54] TREATING RESIDUES FROM THE LEACHING OF ROASTED ZINC BLENDE

[75] Inventors: Adolf von Röpenack; Volker Wiegand, both of Datteln; Günter Smykalla, Gelsenkirchen-Buer, all of Germany

[73] Assignee: Metallgesellschaft Aktiengesellschaft, Frankfurt am Main, Germany

[21] Appl. No.: 800,602

[22] Filed: May 25, 1977

[30] Foreign Application Priority Data

Jun. 2, 1976 [DE] Fed. Rep. of Germany ....... 2624658

[51] Int. Cl.$^2$ ............................................. C01G 9/06
[52] U.S. Cl. .................................. 423/101; 423/106; 423/109; 423/141
[58] Field of Search ............... 423/101, 102, 106, 109, 423/140, 141, 567 A, 571, 578 A, 633; 75/109, 120; 204/119

[56] References Cited

U.S. PATENT DOCUMENTS

| | | | |
|---|---|---|---|
| 1,259,594 | 3/1918 | Betts | 204/119 |
| 2,996,440 | 8/1961 | Forward et al. | 423/109 |
| 3,193,382 | 7/1965 | Veltman et al. | 423/109 |
| 3,484,201 | 12/1969 | Landucci | 423/571 |
| 3,652,264 | 3/1972 | Bodson | 423/109 |
| 3,687,828 | 8/1972 | Carpenter et al. | 204/119 |
| 3,976,743 | 8/1976 | Landucci et al. | 423/109 |

Primary Examiner—Brian Hearn
Attorney, Agent, or Firm—Burgess, Dinklage & Sprung

[57] ABSTRACT

A process for treating a residue from the sulfuric acid leaching of roasted zinc blende, comprising (a) leaching the residue in a single stage with sulfuric acid and a metal sulfide supplied in a quantity sufficient for transforming the iron into divalent iron, the temperature being maintained between about 60° C and the boiling point, (b) heating the mass to a temperature above the melting point of sulfur, separating a first fine-grained residue of low zinc and iron contents and high lead content, and separating a coarse-grained residue containing sulfur, compounds of iron and any excess metal sulfide from (a), (c) adjusting the pH of the residual solution to at most about 2, at a temperature between about 80° C and the boiling point adding zinc dust thereby to precipitate copper and separating the precipitate, (d) adjusting the pH to about 4 to 5 and separating the precipitate which forms, and (e) oxidizing the residual solution to precipitate iron as hematite, and separating the hematite from the purified zinc-containing solution.

6 Claims, 1 Drawing Figure

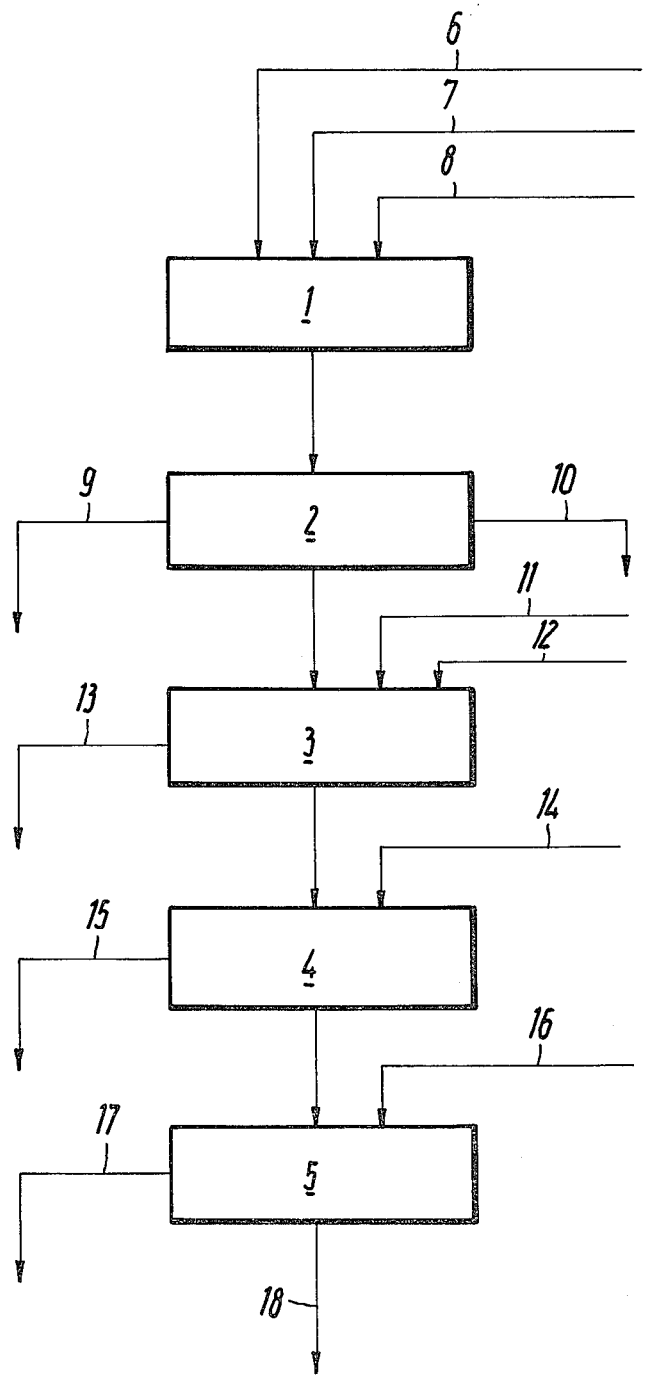

TREATING RESIDUES FROM THE LEACHING OF ROASTED ZINC BLENDE

This invention relates to a process of treating residues from the leaching of roasted zinc blende (e.g. sphalerite) with sulfuric acid, in which process the residue is leached with aqueous sulfuric acid at a temperature in the range between 60° C and the boiling point of the suspension in the presence of metal sulfide in a quantity which is sufficient for transforming the iron into divalent iron, the remaining residue is separated for a recovery of valuable substances such as lead and silver, and the iron contained in the solution is precipitated at elevated temperatures by a treatment with oxygen-containing gas to form hematite ($Fe_2O_3$).

Roasted zinc blende is the main starting material for the production of zinc, mainly by electrolysis. Roasted zinc blende usually contains 55 to 73% zinc, and iron, mostly combined as zinc ferrite, and small percentages of sulfate, sulfide, silicate, aluminate, etc.

Of the processes used to transform the zinc content of the roasted zinc blende into a soluble form so that it can be electrolytically deposited, those which comprise leaching with sulfuric acid are most important. Leaching may be effected in one or more stages and in continuous or batch operation.

Difficulties involved in the leaching are due to the iron which is always contained in the zinc blende and which in the roasting step combines with the zinc to form zinc ferrites, which are difficultly soluble. Because zinc ferrites do not dissolve in sulfuric acid of low concentration, the leached residue contains a considerable quantity of zinc, which is either lost for the process or must be recovered by a treatment with strong sulfuric acid in a second leaching step. Instead of this two-stage leaching, a single leaching step may be employed in which sulfuric acid is employed in such a high concentration that the ferrites are also solubilized.

Roasted zinc concentrates are leached with cold dilute sulfuric acid in the process described in U.S. Pat. No. 1,834,960.

The residue is treated with dilute sulfuric acid again and finally with hot sulfuric acid. The iron contained in the solution is precipitated as basic iron sulfate as a result of basic additions. The residue is then treated further.

A known process of recovering valuable metallic substances from ores or residues which contain iron and other metals, particularly zinc as zinc ferrite, comprises a treatment with sulfuric acid, which contains $H_2SO_4$ not in excess of 250 g/l, in the presence of metallic iron, until the ferrite has been dissolved (U.S. Pat. No. 3,113,860, printed German application No. 1,138230).

The hydrometallurgical extraction of zinc from ores which contain zinc and acid-soluble silicates comprises leaching with sulfuric acid and neutralizing the acid solution with fresh ore. The leaching and neutralization are carried out in the presence of such a quantity of aluminum ions that suspensions are formed which can easily be filtered (printed German application No. 1,040,258).

The recovery of zinc from zinc- and iron-containing residues obtained by the leaching of roasted zinc blende with sulfuric acid comprises a plurality of stages in which an aqueous solution of sulfuric acid is used at elevated temperature and superatmospheric pressure. A reducing agent, e.g., a metal sulfide, is used in the first of these several leaching stages to reduce at least part of the iron contained in the residue to divalent iron (printed German application No. 1,161,433). Iron is precipitated as basic sulfate in a subsequent process step.

In the recovery of zinc from residues which contain zinc ferrites, sulfuric acid having a concentration of 300 g/l $H_2SO_4$ is used to decompose ferrites until the sulfuric acid has a concentration of 180 to 200 g/l $H_2SO_4$. The extract is separated from the residue and diluted with spent electrolyte having an acidity corresponding to 150 to 200 g/l $H_2SO_4$ and is then neutralized with roasted and sintered zinc blende to an acidity corresponding to 3 to 5 g/l $H_2SO_4$. The temperature is maintained between 90 and 95° C throughout the treatment (printed German application No. 1,295,840).

The known processes, particularly those comprising two and more stages, are not very economical because they require expensive equipment. The single-stage processes either enable only an incomplete recovery of zinc or — if a higher yield of zinc is achieved — the excessive concentration of acid results in corrosion problems or pressure-resisting reactors are required.

In another known process, roasted zinc sulfide ores are leached with a solution which contains 180–220 g/l $H_2SO_4$ at temperatures in the range of 95° to 100° C until the sulfuric acid content has decreased to 20 to 60 g/l $H_2SO_4$, alkali metal ions and/or ammonium ions are added to the suspension, and zinc-containing oxidic material is subsequently added to the suspension at temperatures of 95° to 100° C in such quantities that the sulfuric acid concentration of the suspension decreases below 10 g/l $H_2SO_4$ (printed German application No. 1,948,411). While the disadvantages mentioned hereinbefore are avoided just as in the other processes discussed, such process has the serious disadvantage that the iron which is contained in the zinc ore or in the leached residue derived from the roasted zinc blende may be stored only in special dumps and does not become available in a form in which it can be directly used in metallurgical operations.

Besides, the yield of zinc and the transformation of the lead and silver values of the zinc blende to a form which can be processed in a lead-smelting plant are not fully satisfactory.

Finally, it is known to process residues in zinc plants by leaching in a first stage with sulfuric acid under atmospheric pressure and at a temperature above 60° C in the presence of excess zinc sulfide to reduce $Fe^{3+}$ to $Fe^{2+}$. The solid residue is separated and leached with sulfuric acid of much higher concentration and subsequently floated for a separation into unreacted zinc sulfide and elementary sulfur on the one hand, and original ore and lead-containing residue on the other hand. Iron is subsequently separated as hematite by an oxidizing treatment with oxygen under superatmospheric pressure (Opened German specification No. 2,540,641).

The last-mentioned process involves expensive equipment because it comprises two leaching stages and particularly because flotation is required. Besides, the adjuvants used for the flotation may have detrimental influences in the processing of the several phases separated by flotation, particularly in electrolytic operations.

It is accordingly an object of the invention to provide a process which avoids the disadvantages of the known processes, particularly those disadvantages which have been described herebefore, which enables a removal of zinc from the zinc ferrite containing residue to a high degree and transformation of iron into a form in which it can be dumped or can be processed directly, and results in by-products which can be processed in a simple manner or can be recycled to the roasting process, employing relatively inexpensive equipment.

In accordance with the invention this object is accomplished in a overall process starting with a residue from the sulfuric acid leaching of roasted zinc blende and comprising the following steps:

(a) leaching with sulfuric acid is effected in a single stage;

(b) a fine-grained first residue, which has low zinc and iron contents and a high lead content, and a second residue, which is coarse-grained and essentially comprises sulfur, compounds of iron and a surplus of the metal sulfide used to reduce iron, are produced at a temperature above the melting point of sulfur, and the second residue is supplied to a roasting process;

(c) the residual solution is adjusted to a pH value up to 2 and zinc dust is added to the solution at a temperature between about 80° C and the boiling point of the solution to form a copper-containing precipitate which is separated for further processing;

(d) the solution is adjusted to a pH-value in the range of about 4 to 5 thereby forming a precipitate which is removed; and (e) the iron content of the solution is precipitated as hematite and the residual purified solution is supplied to a process for extracting zinc.

The single-stage leaching is suitably effected with sulfuric acid having a concentration of about 120 to 250 g/l. In generally, zinc-depleted spent electrolyte, from an zinc recovery process, is used for this purpose. This electrolyte may be diluted with aqueous effluents or may be fortified with concentrated sulfuric acid. The leaching solvent should be used in such a quantity that the concentration of sulfuric acid at the end of the leaching step is about 15 to 60 g/l, preferably about 20 to 40 g/l. As a result of the selected final concentration and the selected leaching temperature, which lies between about 60° C and the boiling point of the suspension and is optimally about 100° C, the reduction of $Fe^{3+}$ into $Fe^{2+}$ has been substantially completed before $Fe^{3+}$ compounds can be precipitated. Because the selected temperature does not exceed the boiling point, the resulting elementary sulfur cannot melt and prevent a complete reaction in the leaching stage. The above-mentioned final concentration of sulfuric acid is also significant because lower acid concentrations promote formation of sulfate from elementary sulfur.

Preferred metal sulfides used in the leaching stage are those in which the sulfur is exclusively and directly bonded to the metal atom. Zinc sulfide and lead sulfide are particularly suitable, with respect to the further processing of the substances formed in the process. The quantity of metal sulfide must be sufficient to ensure that $Fe^{3+}$ is transformed as completely as possible into $Fe^{2+}$ in accordance with the reaction equation.

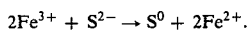

$$2Fe^{3+} + S^{2-} \rightarrow S^0 + 2Fe^{2+}.$$

It is generally desirable to use metal sulfide in an excess of about 10% over the amount which is stoichiometrically required.

After the single leaching stage, a fine-grained first residue, which has low zinc and iron contents and a high lead content, and a granular second residue, which becomes available separately and contains essentially sulfur, compounds of iron and a surplus of the metal sulfide used to reduce iron, are produced at a temperature above the melting point of sulfur. The reference to the melting point of sulfur is not directed to the theoretical melting point of sulfur which is 119° C, but to the temperature at which the sulfur melts in the present system. This may already take place at 110° C if the sulfur which has been formed consists of a mixture of several modifications. To ensure that sulfur is present in molten form in this processing stage, the residues are desirably produced at a temperature in the range of about 120° to 160° C, preferably about 120° to 140° C. A temperature above 160° C should be avoided because it would promote the formation of sulfate from elementary sulfur.

The substances which are not dissolved by leaching can easily be separated into two residues which differ in particle size if, in accordance with a preferred feature of the method according to the invention, a sulfuric acid concentration of about 15 to 60 g/l, particularly about 20 to 40 g/l, is maintained. If the sulfuric acid has been used in the single leaching stage in such a quantity that the final concentration of sulfuric acid is in the above-mentioned range, separate measures are not required for this purpose. In case of a higher concentration of sulfuric acid, the acidity may be decreased by an addition of leached residue, roasted zinc blende or material which contains zinc oxide. Fresh sulfuric acid may be used to strengthen the solution if the concentration is too low.

The formation of residues differing in particle size will be promoted if, in accordance with a further preferred feature of the invention, the suspension being processed contains suspended solids not in excess of about 50 g/l and is intensely stirred to ensure the formation of a substantially homogeneous suspension.

Under the conditions stated above, a granular residue can be produced, which contains up to about 65% by weight of sulfur, as well as a fine-grained high-lead residue, which can be processed without difficulty, e.g., in a lead-smelting plant.

The nature of the roasting process to which the granular residue is supplied, which contains sulfur, compounds of iron and surplus metal sulfide, will mainly depend on the nature of the metal sulfide which is used. Where zinc sulfide is used, that residue can be roasted together with the zinc blende. Where lead sulfide is used, a separate roasting process is required, which may be carried out, e.g., in a lead-smelting plant.

When the residues have been separated, the solution is adjusted to a pH-value up to about 2. This is preferably effected by an addition of roasted zinc blende or other materials which contain zinc oxide. Any residue which is not dissolved in this step, and which mainly comprises zinc ferrite where roasted zinc blende is employed, is recycled to the leaching process.

Cement copper is subsequently precipitated at a temperature in the range from about 80° C to the boiling point of the solution so that a co-precipitation of cadmium is inhibited. Cobalt and nickel metals are co-precipitated with the copper.

After the precipitation of cement copper, the solution is adjusted to a pH value between about 4 and 5. Lime may be used for this partial neutralization. In that case, gypsum will be precipitated as well as the impurities (Ge, In. As, and Tl) which are contained in the solution and which are separated in a suitable manner. If the solution does not contain such impurities or contains them only in small quantities, zinc dust or zinc oxide may be used for the partial neutralization. If zinc dust is used for the partial neutralization, the resulting precipitate is preferably combined with the cement copper which has been precipitated. If zinc oxide is used for the partial neutralization, the formation of a precipitate will be avoided and the solution can be transferred to the iron-precipitating stage without an intermediate treatment.

In the iron-separating stage, the iron contained in the solution is precipitated as hematite ($Fe_2O_3$) by a treatment with an oxygen-containing gas under superatmospheric pressure and at a temperature above about 180° C. To avoid the undesirable formation of basic iron salt and iron hydroxide, the solution is desirably heated as close as possible to 180° C before the oxygen-containing gas is introduced.

After the precipitation of iron, the hematite is removed from the solution and the latter is then supplied to a process of recovering zinc. For this purpose, zinc oxide may be added to the solution or the latter may be used to leach fresh roasted zinc blende so that the zinc content of the solution is increased and the sulfuric acid content which has been increased as a result of the precipitation of iron is decreased.

BRIEF DESCRIPTION OF THE DRAWING

The invention will be explained more fully with reference to the drawing which is a schematic flow sheet of the process according to the invention.

The essential stages of the process are represented by blocks 1 to 5. A leaching stage 1 is supplied via conduit 6 with residue from the leaching of roasted zinc blende with sulfuric acid, via conduit 7 with sulfuric acid and via conduit 8 with metal sulfide. When the leaching has been terminated, the suspension is fed to stage 2, in which a fine-grained first residue, which has low zinc and iron contents and a high lead content, and a granular second residue, which becomes available separately and contains essentially sulfur, compounds of iron and a surplus of the metal sulfide used to reduce iron, are separated. The first residue is discharged via conduit 9 and the second residue via conduit 10. The solution enters processing stage 3 in which e.g., roasted zinc blende is added via conduit 11 to adjust the solution to a pH value up to 2, and zinc dust is then added via conduit 12 to the solution at a temperature between 80° C and the boiling point of the solution to precipitate cement copper. The residue which forms as a result of this partial neutralization and the cement copper which has been precipitated are successively discharged via conduit 13. The solution then enters process stage 4, in which it is adjusted to a pH value in the range from 4 to 5 by an addition, e.g., of lime via conduit 14. Gypsum and constituents which have been precipitated from the solution by the partial neutralization are withdrawn via a conduit 15. The solution is then transferred to processing stage 5 and is treated with oxygen-containing gas, which is supplied via conduit 16. Resulting hematite is separated via conduit 17. The solution is supplied via conduit 18 to the process of recovering zinc.

The invention is further described in the following illustrative example:

EXAMPLE

The leaching stage 1 was supplied via conduit 6 with 7 liters of a suspension having a solids content of 3.29 kg and consisting of the residue from the leaching of roasted zinc blende with sulfuric acid and via conduit 7 with 28 liters of spent electrolyte used for the extraction of zinc. 1.12 kg zinc blende (8% surplus) were added via conduit 8. The analysis values of the substances fed are compiled in the following table:

Table 1

| Element | Residue fed to leaching stage % by weight | Zinc Blende % by weight | Spent electrolyte used for recovery of zinc g/l |
|---|---|---|---|
| Zn | 17.0 | 49.0 | 49 |
| Fe | 34.2 | 9.6 | — |
| Pb | 4.0 | 0.7 | — |
| Cd | 0.15 | 0.25 | — |
| Cu | 1.0 | 0.45 | — |
| Sulfide sulfur | 0.2 | 31.0 | — |
| Sulfate sulfur | 3.7 | 0.45 | — |
| $SiO_2$ | 7.1 | 2.8 | — |
| Sn | 0.3 | 0.2 | — |
| Ag | 450 g/t | 210 g/t | — |
| $H_2SO_4$ | | | 177 |

The suspension was leached at 95° C for 2 hours and was then transferred to treating stage 2 and was heated there to 130° C in an autoclave, which was emptied when the suspension had been intensely stirred for two hours at a solids content of 34.3 g/l. Two solids had formed, which differed greatly in behavior and appearance. One residue was fine and light gray in color. The other was coarse-grained, similar to pellets, and dark gray in color. Because the residues had different specific gravities, they differed in settling characteristics and for this reason could easily be separated from the solution in succession.

The quantities and analyses of solids and solution obtained after the leaching stage 1 and after the production of the different residues in stage 2 are compiled in Table 2.

Table 2

| | Quantity | Zn | $Fe^{2+}$ | $Fe^{3+}$ | Pb | S | $H_2SO_4$ |
|---|---|---|---|---|---|---|---|
| Stage 1 | | | | | | | |
| Solids (%) | 1260 g | 9.8 | | 12.6 | 10.9 | 21.6 | |
| Solution (g/l) | 35 l | 93.5 | 27.2 | 3.8 | | | 37 |
| Stage 2 | | | | | | | |
| Solution (g/l) | 35 l | 95.0 | 30.3 | 2.0 | | | 38 |
| Residue I (< 71 um) (%) | 780 g | 3.0 | | 7.8 | 17.3 | 4.3 | |
| Residue II (> 71 um) (%) | 420 g | 11.4 | | 10.3 | 0.6 | 62.0 | |

Particularly the data stated for stage 2 show clearly that the fine-grained residue contained only about 3% by weight of zinc but had a high lead content. The coarse residue had a high sulfur content of 62% by weight. In other respects, the composition of this residue was highly similar to that of sphalerite.

Of the zinc which was contained in the residue and the zinc blende supplied to the process, 93.6% entered the solution. The 4.3% which entered residue II could be recycled to the process for roasting zinc blende.

After the removal of residues I and II, the solution was transferred to stage 3 where 1.575 kg of roasted zinc blende supplied via conduit 11 and composed of 58.5% by weight Zn
10.4% by weight $Fe_{total}$
0.56% by weight Cu
0.29% by weight Cd were added to the solution to adjust the pH value of the liquid phase to 1.8. The residue was separated and recycled via conduit 13 to leaching stage (1).

0.105 kg pure zinc dust was then added to the solution at 90° C to precipitate cement copper containing 58% by weight Cu, 7.0% by weight Zn, 5% by weight As, 2% by weight $SO_4$ (calculated as S), balance further impurities.

When the cement copper had been separated and removed via conduit 13, lime in the form of a suspension containing 0.175 kg Ca (OH)$_2$/l was supplied via conduit 14 to the solution to adjust the same to pH 4.5. The resulting residue (0.245 kg) consisted substantially of gypsum and was removed via conduit 15.

To precipitate iron as hematite, the solution was transferred to processing stage 5 and was initially heated there to 180° C in an autoclave, which was subsequently supplied with oxygen under a pressure of 10 bars. 1.4 kg hematite which contained 65% by weight $Fe^{3+}$ were formed.

The residual solution, containing

| 120 | g/l Zn |
| 3.4 | g/l $Fe^{3+}$ |
| 0.055 | g/l Cu |
| 0.35 | g/l Cd |
| 44 | g/l $H_2SO_4$, | was forwarded to the leaching step for roasted zinc blende.

The total yield of zinc in the leaching and residue-separating stages of the process of the invention, comprising a single leaching stage, totals 97.9% (93.6% in the solution and 4.3% in the recycled residue), making a second leaching stage unnecessary.

It will be appreciated that the instand specification and examples are set forth by way of illustration and not limitation, and that various modifications and changes may be made without departing from the spirit and scope of the present invention.

What is claimed is:
1. A process for treating a residue from the sulfuric acid leaching of roasted zinc blende, comprising
   (a) leaching the residue in a single stage with a solution containing about 120 to 250 g/l of sulfuric acid and a metal sulfide supplied in a quantity sufficient for transforming the iron in the residue into divalent iron with concurrent formation of elemental sulfur, the temperature being maintained between about 60° C and the boiling point, the resulting suspension having a sulfuric acid concentration of about 15 to 60 g/l,
   (b) heating the suspension to a temperature above the melting point of sulfur, separating a first fine-grained residue of low zinc and iron contents and high lead content, and separating a coarse-grained residue containing sulfur, compounds of iron and any excess metal sulfide from (a),
   (c) adjusting the pH of the residual solution to at most about 2, and at a temperature between about 80° C and the boiling point adding zinc dust thereby to precipitate copper and separating the precipitate,
   (d) adjusting the pH to about 4 to 5 and separating any precipitate which forms, and
   (e) oxidizing the residual solution to precipitate iron as hematite, and separating the hematite from the purified zinc-containing solution.

2. A process according to claim 1, wherein the temperature in step (b) is about 120° to 160° C.

3. A process according to claim 1, wherein the final concentration of sulfuric acid in step (b) is from about 15 to 60 g/l.

4. A process according to claim 1, wherein the mixture in step (b) contains up to about 50 g/l of suspended solids.

5. A process according to claim 1, wherein the solution in step (e) is heated to a temperature close to 180° C before the iron content is precipitated as hematite.

6. A process according to claim 5, wherein in step (b) the mixture contains up to about 50 g/l of suspended solids, the final concentration of sulfuric acid is from about 20 to 40 g/l and the temperature is about 120° to 140° C.

* * * * *